United States Patent Office 3,450,513
Patented June 17, 1969

3,450,513
DIESEL OIL FUEL COMPOSITIONS CONTAINING OIL-SOLUBLE METAL SALTS OF PARTIAL IMIDE POLYMER RESINS
Seymour H. Patinkin, Chicago, Joseph A. Verdol, Dolton, and Donald J. Carrow, Riverdale, Ill., assignors to Sinclair Research, Inc., New York, N.Y., a corporation of Delaware
No Drawing. Filed Dec. 1, 1967, Ser. No. 687,143
Int. Cl. C10l 1/14, 1/22, 1/30
U.S. Cl. 44—62       6 Claims

ABSTRACT OF THE DISCLOSURE

Diesel oil fuel compositions are disclosed containing a small amount, effective to improve combustion properties of the diesel oil fuel, of an oil-soluble metal salt of a partial imide polymer resin which is the reaction product of a monoamine or a polyamine with a polymer resin of maleic anhydride and a monovinyl monomer, which is an alkyl monovinyl ether or a monovinyl hydrocarbon, of 2 to 12 carbon atoms, such as styrene. These metal salts of the patrial imides are effective additives in small amounts of, for instance, about .001 to 0.5% by weight, in diesel oil fuels to prevent or reduce the formation of deleterious deposits and to prevent or reduce the production of exhaust smoke or combustion in diesel engines.

---

This invention relates to new oil additives and to fuel compositions suitable for use in an internal combustion engine of the compression ignition type. More particularly, this invention relates to oil-soluble metal salts of partial imide polymer resins and to diesel oil fuel compositions containing these oil-soluble metal salts of partial imide polymer resins, as an additive, in a small amount, effective to improve the combustion properties of the diesel oil fuel.

Fuels used for diesel engines today often contain large volumes of cracked or cycle hydrocarbon stocks boiling in the range of about 350° F. to 750° F. These stocks exhibit a marked tendency to form injector nozzle deposits and other deleterious combustion chamber deposits. It is known that excessive injector nozzle deposits result in a disruption of fuel spray patterns, thereby causing excessive exhaust smoke. Injection needle deposits form and cause sticking of the needle valve and consequently contribute to excessive exhaust smoke in diesel engines. The formation of these deposits is the result of thermal decomposition of the fuel. The abatement of excessive exhaust smoke to prevent or reduce air pollution is a major problem in large cities today.

In accordance with this invention, there have been obtained novel oil-soluble metallic salts of partial imide polymer resins which are the reaction product of monoamines or polyamines with a polymer resin of a monovinyl monomer of 2 to 12 carbon atoms and maleic anhydride. The formation of deleterious deposits and the production of exhaust smoke can be prevented or reduced on combustion of diesel hydrocarbon fuel oils by the addition thereto of a small, effective amount of these oil-soluble metallic salt, partial imide polymer resins. The small, effective amount of the oil-soluble metallic salt, partial imide polymer resin of this invention incorporated in the diesel fuel oil is often about 0.001 to 0.5% or more, and preferably about 0.005 to 0.05%, by weight, of the diesel fuel oil.

The polymer resin of the vinyl compound and maleic anhydride, with which the monoamine or polyamine are reacted, are resinous polymers having about 1 to 4 moles, preferably about 1 to 3 moles, of monovinyl compound per mole of maleic anhydride. Suitable vinyl compounds include for instance, ethylene, propylene, butylene, pentylene, hexylene, heptylene, octylene, nonylene, decylene, dodecylene, methyl vinyl ether, ethyl vinyl ether, butyl vinyl ether, styrene and the like. Thus these vinyl monomers of 2 to 12 carbon atoms include alkyl monovinyl ethers and monovinyl hydrocarbons, particularly monovinyl aliphatic hydrocarbons and styrene. The preferred vinyl monomer is styrene. If desired, maleic acid can be used instead of maleic anhydride in the formation of the polymer resin with the vinyl monomer.

The resinous polymer reactant of the invention contains repeating vinyl compound-maleic anhydride units with an average molecular weight of at least about 400 to about 10,000 which can be higher providing the additive synthesized from the resin is soluble in distillate diesel fuels. The preferred average molecular weight is about 400 to 4,000. The melting points of the lower molecular weight polymers, will generally range from about 80 to 300° C. as determined by the Fisher-Johns Melting Point Apparatus. The determination of average molecular weight as used herein is made by the Thermoelectric Differential Vapor Pressure Lowering Method on a Microlam Osmometer. The polymer of the vinyl monomer, such as styrene, and maleic anhydride can be prepared by known methods.

A preferred method is by solution polymerization where the monomers are polymerized in a suitable solvent employing as a polymerization catalyst a free-radical peroxide catalyst, preferably benzoyl peroxide or dicumyl peroxide, at a temperature of about 75 to 300° C. or more. Suitable solvents include the aromatic hydrocarbon solvents, such as cumene, p-cymene, xylene, toluene, etc. The aromatic solvents may serve as chain-terminating solvents and give lower molecular weight products. Other suitable solvents are the ketones, such as methylethyl ketone, which may also be chain-terminating solvents.

The preferred manner of carrying out the polymerization is by what is known in the art as incremental feed addition. By this method the monomers and catalysts are first dissolved in a portion of the solvent in which the polymerization is to be conducted and the resulting solution fed in increments into a reactor containing solvent heated to reaction temperature, usually the reflux temperature of the mixture. When an aromatic solvent is employed as the solvent for the polymerization, the formation of the ploymers causes a heterogeneous system, the polymer layer being the heavier layer and recoverable by merely decanting the upper aromatic solvent layer and drying. On the other hand, when a ketone is the solvent, the formed polymer is usually soluble in the solvent media so that recovery of the products necessitates a solvent-stripping operation. The preferred polymer resins are the styrene-maleic anhydride polymers of 1:1 to 4:1 mole ratio and preferably 1:1 to 3:1 mole ratio.

The monoamine reactant of this invention is an oil-soluble, i.e., soluble in hydrocarbon fuel oil, monoamine having the formula:

where R is hydrocarbon, preferably alkyl, of up to about 25 carbon atoms or more, preferably 6 to 25 carbon atoms, and R' is R or hydrogen and one of the R groups, preferably, has at least about 6 or 8 carbon atoms. R can be straight or branch chained, saturated or unsaturated, aliphatic or aromatic and is preferably saturated. The preferred monoamines are the primary monoamines, particularly the primary monoalkylamines of 8 to 25 carbon atoms. Examples of suitable monoamines are 2-ethylhexylamine, n-octylamine, decylamine, octadecylamine, stearylamine, laurylamine, N-methylstearylamine, N-ethyloctadecylamine, N-butyllaurylamine, and the like or mixtures thereof. The monoamine can also be substituted on the hydrocarbon radicals with groups which do not interfere with the reaction of the amino group of the amine with the anhydride or acid moiety of the resinous vinyl compound-maleic anhydride copolymer and do not otherwise deleteriously affect the desired properties of the final reaction product. Illustrative of non-interfering groups are carboxyl, halo, nitro, etc. groups.

The polyamine reactant of this invention is an oil-soluble, i.e. soluble in hydrocarbon fuel oil, polyamine having the formula:

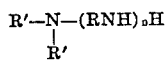

where R is an alkylene radical of 2 to about 25 carbon atoms, preferably 2 to 4 carbon atoms, R' is hydrogen or a hydrocarbon radical, preferably alkyl, of up to about 25 carbon atoms, $n$ is about 1 to 100, and usually 2 to 10, and the sum of the carbon atoms in the R and R' groups, preferably, is at least about 6 or 8.

These polyamines include monoalkylene diamines, dialkylaminoalkylamines and the polyalkylenepolyamines, preferably having a total of at least 6 or 8 carbon atoms, and more preferably, with at least about 6 or 8 carbon atoms in one of the groups attached to nitrogen. Illustrative of suitable monoalkylene diamines are octylene diamine, decylene diamine, etc. Examples of suitable dialkylaminoalkylamines are dimethylaminopropylamine, dimethylaminobutylamine, diethylaminopropylamine, diethylaminoamylamine, dipropylaminopropylamine, methylpropylaminoamylamine, propylbutylaminoethylamine, etc. Examples of the polyalkylenepolyamine reactants are triethylenetetramine; tetraethylenepentamine; polyethylenelimine; di-(methylethylene) triamine; hexapropyleneheptamine; tri(ethylethylene)tetramine; penta(1-methylpropylene) hexamine, tetrabutylenepentamine, etc.

The partial imide, used to form the additive of this invention, can be prepared by simply heating at elevated temperature about 0.1 to 0.9 or more, such as up to about 2 moles, and preferably 0.5 to 0.9 mole, of the amine per average anhydride unit per mole of the vinyl compound-maleic anhydride polymer. A temperature of about 125° C. is usually necessary to effect the reaction and temperatures up to about 350° C. can be used but temperatures beyond about 350° C. are generally not utilized in that they may cause undesirable side reactions or degradation of the product. The preferred reaction temperatures are about 190 to 280° C. The reaction may be carried out in bulk or in the presence of a suitable mutual solvent, such as a mineral lubricating oil. The reaction time will vary depending upon the particular reactants employed but will usually range from about 1 to 5 hours up to 24 hours or several days if necessary.

By controlling the amount of amine or polyamine reactant in relation to the average anhydride units per molecule and the time of reaction, the vinyl compound-maleic anhydride polymer is imidated to from about 10 to 90% imide groups based on the average anhydride groups per molecule of said polymer, and preferably from about 50% to 90% imide groups per molecule. While some amide groups may be present, these partial imides are predominantly and essentially imides.

The remaining anhydride or carboxyl groups in the partial imides are salt forming groups and on reaction with metal compounds, as hereinafter described, form metal salts of the partial imides. The metal salts of these partial imides contain about 5 to 90% metal carboxyl salt groups based on the average anhydride groups per molecule of said polymer, and preferably about 50% to 5% metal carboxyl salt groups. It is preferred that the metal salts of the partial imides contain little or essentially no free or unreacted anhydride or carboxyl groups, e.g. not more than about 5% based on the average anhydride groups per molecule of said polymer.

The preferred metal salts of these partial imides are those of the alkali metals, such as lithium and sodium, the alkaline earth metals, such as calcium and barium, the iron group metals, such as nickel, and the metals of Group V–B of the Periodic Table according to Mendeleeff, such as bismuth.

The metal salt of the partial imide can be prepared by any of several methods. A preferred method is to react a 25 to 50 wt. percent oil solution of the vinyl compound-maleic anhydride partial imide with a metal carbonate in the presence of water. About 400 parts of the oil solution of the partial imide, 200 parts of water and 10 to 100 parts of the metal carbonate can be heated to the boiling point of water under a nitrogen atmosphere until completion of the reaction. The product is a metal salt of the partial imide.

Another preferred method is the reaction of the vinyl compound-maleic anhydride partial imide with an alkali metal hydroxide, preferably lithium hydroxide. The alkali metal product is then reacted with a metal salt, such as a chloride or nitrate of the metal. The first step of the reaction can be carried out by heating at reflux a mixture of 400 parts of the partial imide solution, 200 parts of water and 25 parts of lithium hydroxide. From 10 to 100 parts of the desired metal salt in aqueous solution is added to the reaction pot and the reaction continued for up to 12 hours or until the metal exchange is complete. Other conventional methods of forming metal salts known to the art can be used to prepare the metal salts of the partial imides of this invention.

A series of metal salts of the partial imides of the styrene-maleic anhydride resin were prepared and tested in diesel fuel. In all the following examples of styrene-maleic anhydride resin had a molecular weight within the range of about 1600 to 1800 and a styrene to maleic anhydride ratio of about 1:1. The amine in these examples was octadecylamine.

The following examples further illustrate the invention.

Example A

The partial imide of styrene-maleic anhydride polymer using octadecylamine was prepared as follows:

Into a two-liter resin kettle, equipped with stirrer, nitrogen inlet tube, thermometer, and reflux condenser equipped with Dean Stark Trap, was placed 389 grams of a 95 VI mineral lubricating oil having a viscosity of 150 SUS at 100° F. and 0.116 mole of styrene-maleic anhydride resin (202 g.), having an average molecular weight of about 1735 and a styrene to maleic anhydride ratio of 1:1, and 202.5 grams (0.75 mole) of octadecylamine. The resin kettle was immersed in an oil bath of 250° C., and the reaction was allowed to continue for 24 hours. Is was adjusted to 25% concentration by addition of more oil at which time the product was removed. The product, the 25% solution of the octadecylamine partial imide of styrene-maleic anhydride polymer, had a saponification number 52.13 and 0.57% nitrogen. Approximately 70% of the anhydride groups were converted to imide groups.

Example I

The barium salt of the octadecylamine partial imide of styrene-maleic anhydride resin was prepared as follows:

Into a one-liter resin kettle, equipped as previously described in Example A, was placed 400 g. of the 25% solution of the partial imide, prepared as described above in Example A, 25 grams of barium carbonate and 200 grams of distilled water. The kettle was then immersed in an oil bath at 100° C. for 12 hours after which the temperature was increased to 125° C. for dehydration before the product was removed. The product was diluted with 400 mls. of benzene, and filtered to remove the inorganic salt. The solvent was then removed in vacuo. The product, the barium salt of the partial imide, had an acid number at pH 11 of 0.35, 0.58% nitrogen and 0.98% barium.

Example II

The bismuth salt of the octadecylamine partial imide of the styrene-maleic anhydride resin was prepared as follows:

Into a one-liter resin kettle, equipped as previously described in Example A, was placed 400 grams of the 25% solution of the partial imide of Example A, 25 grams of lithium hydroxide and 200 grams of water. The kettle was immersed in an oil bath at 100° C. and the contents were stirred for two hours. At that point 50 grams of bismuth chloride were added. The reaction was continued for 10 hours. The product was dehydrated by heating at 125° C. The product was diluted with benzene and filtered and then the solvent removed in vacuo. The product, the bismuth salt of the partial imide, had an acid number at pH 11 of 37.3, 0.76% nitrogen and 2.6% bismuth.

Example III

In a one-liter resin kettle, equipped as previously described in Example A, the octadecylamine partial imide of styrene-maleic anhydride polymer was prepared and then without working up the partial imide it was reacted with calcium hydroxide to form the calcium salt of the partial imide as follows:

Into the kettle was placed 60 grams of the styrene-maleic anhydride resin, 60.2 grams of octadecylamine and 368 grams of the mineral oil. The kettle was placed in an oil bath at 220° C. and the contents stirred at this temperature for 20 hours. The temperature was lowered to 125° C. and a slurry of 10.9 grams of $Ca(OH)_2$ in water was added. The reaction was continued for an additional 2 hours after which the product was separated and filtered. The product, the calcium salt of the partial imide, had an acid number at pH 11 of 0.56, 0.66% nitrogen and 0.169% calcium.

Example IV

In addition to the barium, bismuth and calcium salts of the partial imide, there were prepared in a similar manner, the nickel, sodium and lithium salts of the octadecylamine partial imide of styrene-maleic anhydride polymer. These additives, together with two of these partial imides themselves, test numbers 2 and 3 (not metal salt), are listed in Table I with their properties. The partial imide listed as test number 3 was a 50% by weight solution in mineral oil. The other partial imide, test number 2, and all the metal salts, test numbers 4–11, were 25% by weight solutions in mineral oil.

In Table II examples of diesel fuel containing a small quantity of these metal salts of the octadecylamine partial imide of styrene-maleic anhydride polymer are set forth together with data on performance tests in the ASTM-CRC Modified Coker Test. A small quantity of the metal salts of the partial imide, such as .02% or .005% by weight as shown in Table II, was incorporated in diesel oil fuel by stirring or mixing in the conventional manner of incorporating additives to diesel oil fuel.

The modified ASTM-CRC Fuel Coker is used to evaluate the deposit and filter-plugging characteristics of diesel fuels under severe high temperature operating conditions. The severity level of the technique is increased by prestressing the fuel for 4 hours at 175° F. prior to evaluation in the coker. Increased severity appeared desirable to more clearly differentiate between fuels with respect to preheater tube deposits and filter plugging. The increase in pressure drop through the filter is measured in inches of mercury with respect to minutes and is a measure of the degree of filter plugging. The laydown deposits on the preheater tube is reported in accordance with the deposit code shown in Table II.

As shown in Table II, test number 1 was on the diesel fuel with no additive, test numbers 2 and 3 were on the diesel fuel with .02% by weight of the partial imide itself (not a metal salt) as the additive. Test numbers 5 and 8 were run on the diesel fuel with .02% by weight of the bismuth salt of the partial imide and test number 9 was run on the diesel fuel with .005% by weight of the bismuth salt of the partial imide. Test numbers 4, 6, 7, 10 and 11 were run on the diesel fuel with .02% by weight respectively of the barium, nickel, calcium, sodium and lithium salts of the partial imides.

The data in Table II shows that only small or negligible pressure drop increases occur in diesel fuel containing the metal derivatives. Preheater deposits are also low or negligible in most cases where metal derivatives are used. On the other hand, the neat fuel, test number 1, completely plugs in 154 mintues or about half of the normal test period of 300 minutes. The metal-free partial imide, test numbers 2 and 3, does not improve the fuel performance with respect to deposit buildup as determined by inspection of the preheater or measurement of pressure drop.

TABLE I.—PROPERTIES OF ADDITIVE-OCTADECYLAMINE PARTIAL IMIDES OF STYRENE-MALEIC ANHYDRIDE RESIN AND THEIR METAL SALTS

| Metal | Test No. | Percent metal [1] | Percent nitrogen [1] | Percent additive in mineral oil |
|---|---|---|---|---|
| None | 2 | | 0.57 | 25 |
| Do | 3 | | 1.58 | 50 |
| Barium | 4 | 0.98 | 0.58 | 25 |
| Bismuth | 5, 8, 9 | 2.6 | 0.76 | 25 |
| Nickel | 6 | 0.86 | 0.64 | 25 |
| Calcium | 7 | 0.17 | 0.66 | 25 |
| Sodium | 10 | 0.39 | 0.66 | 25 |
| Lithium | 11 | 0.20 | 0.64 | 25 |

[1] The percent metal and percent nitrogen is based on the combined weight of additive and mineral oil.

TABLE II.—THE EFFECT OF OCTADECYLAMINE PARTIAL IMIDES OF STYRENE-MALEIC ANHYDRIDE RESINS AND THEIR METAL SALTS ON PERFORMANCE OF DIESEL FUEL IN THE MODIFIED ASTM-CR COKER TEST

[Prestress, 175° F., 4 hours; preheater, 375° F., filter, 475° F.]

| Test No. | 1 | 2 | 3 | 4 | 5 | 6 | 7 | 8 | 9 | 10 | 11 |
|---|---|---|---|---|---|---|---|---|---|---|---|
| Fuel additive | None | | | | | | | | | | |
| Conc., wt. percent | | 0.02 | 0.02 | 0.02 | 0.02 | 0.02 | 0.02 | 0.02 | 0.005 | 0.02 | 0.02 |
| Metal | | None | None | Ba | Bi | Ni | Ca | Bi | Bi | Na | Li |
| Pressure drop, min.: | | | | | | | | | | | |
| 0.3″ P | 33 | 58 | 55 | | | | 239 | | | | |
| 1.0″ P | 50 | 113 | 81 | | | | | | | | |
| 3.0″ P | 69 | 153 | 107 | | | | | | | | |
| 10.0″ P | 109 | 190 | 134 | | | | | | | | |
| 25.0″ P | 154 | 218 | 164 | | | | | | | | |
| Highest No. along tube | 2 | 3 | 2 | 1 | 1 | 0 | 1 | 1 | 0 | 1 | 2 |
| Maximum P | 25″+ | 25″+ | 25″+ | 0.3″ | 0.05″ | 0.1″ | 0.4″ | 0.0″ | 0.13″ | 0.0″ | 0.05″ |

CRS deposit code: 0—No visible deposits; 1—Visible haze or dulling, but no visible color; 2—Barely visible discoloration; 3—Light tan to Peacock stain; 4—Heavier than code 3.

It is claimed:
1. A diesel oil fuel composition containing a small amount, effective to improve combustion properties, of an oil-soluble metal salt of a partial imide polymer resin which partial imide is the reaction product prepared at a temperature within the range of about 125° to 350° C. of:
(I) an amine selected from the group consisting of:
(A) oil-soluble monoamines having the formula:

wherein R is hydrocarbon of up to about 25 carbon atoms, R' is selected from the group consisting of R and hydrogen, and (B) oil-soluble polyamines having the formula:

$$R'-N(R')-(RNH)_nH$$

where R is alkylene of 2 to about 25 carbon atoms, R' is selected from the group consisting of hydrogen and hydrocarbon of up to about 25 carbons, and $n$ is a number of 1 to 100, and (II) a polymer resin of a monovinyl monomer of 2 to 12 carbon atoms and maleic anhydride in a mole ratio of monovinyl monomer to maleic anhydride of about 1:1 to 4:1, said monovinyl monomer being selected from the group consisting of alkyl monovinyl ethers and monovinyl hydrocarbons, and said polymer resin having an average molecular weight of about 400 to 10,000, said amine being present in amount of about 0.1 to 2 moles per average anhydride unit in said polymer resin, and the metal of said metal salt being selected from the group consisting of alkali metals, alkaline earth metals, metals of the iron group, and metals of Group V-B of the Periodic Table according to Mendeleeff.

2. A diesel oil fuel composition of claim 1 wherein the amount of oil-soluble metal salt of said partial imide polymer resin is 0.001 to 0.5% by weight of said diesel oil fuel.

3. A diesel oil fuel composition of claims 1 wherein the monovinyl monomer is styrene.

4. A diesel oil fuel composition of claim 1 where said amine is a primary monoalkylamine of 8 to 25 carbon atoms.

5. A diesel oil fuel composition of claim 1 where said amine is octadecylamine.

6. A diesel oil fuel composition of claim 1 wherein said amine is octadecylamine, said polymer resin is a styrene-maleic anhydride resin in a mole ratio of styrene to maleic anhydride of about 1:1 and having an average molecular weight of about 1600 to about 1800, and the metal of said metal salt is selected from the group consisting of barium, bismuth, nickel, calcium, sodium and lithium.

References Cited

UNITED STATES PATENTS 3,085,866   4/1963   Gay et al. _____ 44—57
3,348,932   10/1967   Kukin _____ 44—57 XR DANIEL E. WYMAN, *Primary Examiner.*

W. J. SHINE, *Assistant Examiner.*

U.S. Cl. X.R.

44—57, 63, 68